US009357871B2

(12) United States Patent
Coccia

(10) Patent No.: US 9,357,871 B2
(45) Date of Patent: Jun. 7, 2016

(54) COFFEE MACHINE WITH DISPENSING REGULATION AND A METHOD RELATING THERETO

(75) Inventor: Andrea Coccia, Binasco MI (IT)

(73) Assignee: Gruppo Cimbali S.p.A., Binasco MI (IT)

( * ) Notice: Subject to any disclaimer, the term of this patent is extended or adjusted under 35 U.S.C. 154(b) by 317 days.

(21) Appl. No.: 12/909,379

(22) Filed: Oct. 21, 2010

(65) Prior Publication Data

US 2011/0097454 A1  Apr. 28, 2011

(30) Foreign Application Priority Data

Oct. 23, 2009 (EP) .................................... 09425423

(51) Int. Cl.
*A47J 31/36* (2006.01)
*A47J 31/52* (2006.01)
*A47J 31/54* (2006.01)
(Continued)

(52) U.S. Cl.
CPC *A47J 31/36* (2013.01); *A47J 31/52* (2013.01); *A47J 31/54* (2013.01); *A23F 5/26* (2013.01); *A47J 31/40* (2013.01)

(58) Field of Classification Search
CPC ........... A47J 31/36; A47J 31/52; A47J 31/54; A47J 31/40
USPC ............. 426/231, 520, 394, 594, 432; 99/283
See application file for complete search history.

(56) References Cited

U.S. PATENT DOCUMENTS 2,878,747 A  3/1959  Cimbali
3,119,322 A  1/1964  Valente (Continued)

FOREIGN PATENT DOCUMENTS

CH           262232       9/1949
DE    20 2006 014317     2/2008
(Continued)

OTHER PUBLICATIONS

European Search Report for EP 09 42 5423.2, dated Mar. 11, 2010.
(Continued)

*Primary Examiner* — Erik Kashnikow
*Assistant Examiner* — Preston Smith
(74) *Attorney, Agent, or Firm* — Alan G. Towner, Esq.; Pietragallo Gordon Alfano Bosick & Raspanti, LLP

(57) ABSTRACT

The present invention relates to a coffee machine for producing and dispensing coffee-based beverages comprising a hydraulic pump (35), at least one dispensing device (13) comprising a filter unit (31) apt to contain ground coffee and a supply unit (14) apt to supply water to the filter unit when the filter unit is engaged with the supply unit and a hydraulic circuit which brings the hydraulic pump into fluid communication with the supply unit of the dispensing device, the hydraulic circuit comprising a supply duct (11) which supplies hot water under pressure to the supply unit, characterized in that it further comprises a system for controlling the dispensing pressure which comprises a control unit (22), a pressure sensor (21) disposed along the hydraulic circuit and apt to generate a control signal representative of the pressure detected, the pressure sensor being electronically connected to a control unit to detect the dispensing pressure, and a hydraulic variable-flow valve (36) disposed along the hydraulic circuit and apt to supply variable quantities of water to at least one dispensing device, the variable-flow valve being actuated by an electronic drive controlled electronically by the control unit in order to regulate the flow rate of water output as a function of a detected dispensing pressure value. The invention relates, moreover, to a method for controlling the dispensing pressure in a coffee machine.

6 Claims, 5 Drawing Sheets

(51) Int. Cl.
*A47J 31/40* (2006.01)
*A23F 5/26* (2006.01)

(56) References Cited

U.S. PATENT DOCUMENTS

| | | | |
|---|---|---|---|
| 3,230,974 A | 1/1966 | Valente | |
| 4,736,875 A * | 4/1988 | King | 222/641 |
| 6,345,570 B1 * | 2/2002 | Santi | 99/289 R |
| 7,322,275 B2 | 1/2008 | Lusi | |
| 2005/0247204 A1 * | 11/2005 | Lafond et al. | 99/279 |
| 2006/0096465 A1 | 5/2006 | Hu et al. | |
| 2007/0157820 A1 | 7/2007 | Bunn | |

FOREIGN PATENT DOCUMENTS

| | | | | |
|---|---|---|---|---|
| EP | 0 934 719 | | 8/1999 | |
| EP | 1 210 893 | | 6/2002 | |
| EP | 1 312 291 | | 5/2003 | |
| EP | 1163185 | * | 8/2004 | ............... B67D 1/14 |
| EP | 1 676 509 | | 7/2006 | |
| EP | 1839541 | * | 10/2007 | ............... A47J 31/00 |
| EP | 1867262 | * | 12/2007 | ............... A47J 31/54 |
| EP | 1 882 433 | | 1/2008 | |
| GB | 2 008 540 | | 6/1979 | |
| WO | WO 01/74212 | | 10/2001 | |
| WO | WO 2008/038201 | | 4/2008 | |
| WO | WO 2008/087677 | | 7/2008 | |
| WO | WO 2009/010190 | | 1/2009 | |

OTHER PUBLICATIONS

Italian Search Report, dated Jun. 7, 2010.

* cited by examiner

COFFEE MACHINE WITH DISPENSING REGULATION AND A METHOD RELATING THERETO

This application claims priority to EP Application No. 09425423.2 filed 23 Oct. 2009, the entire contents of which is hereby incorporated by reference.

The present invention relates to a coffee machine provided with water pressure regulation and a method for controlling the pressure in the filter chamber of a coffee machine.

Coffee, as a drink, has always been very widespread and popular; in fact, it is nowadays available in many forms which differ from one another in terms both of their starting blend and the way in which the beverage is extracted.

Espresso coffee is in particular a beverage obtained using a coffee machine which forces hot water to pass through a layer of ground coffee, i.e. coffee powder, contained in an infusion container, generally a metal filter. The water which passes through the layer of coffee has to be heated to a certain temperature and is subject to a certain pressure, the optimum temperature and pressure being selected, among other things, in relation to the starting blend.

Coffee powder for the preparation of espresso coffee is typically obtained by grinding or milling roasted coffee beans.

In order to force hot water to pass through the coffee powder, the initial machines used the thrust of the pressure generated by the saturated steam boiler having a value of 1-1.5 bar. A pressure of from 1 to 1.5 bar corresponds to a temperature of more than 100° C. and therefore, as for obtaining a high quality beverage the water for its preparation should not exceed 100° C., the coffee obtained from the machines tended to have a "burnt" taste.

To remedy this problem, coffee machines were developed with mechanical compression means which made it possible to obtain an infusion at approximately 100° C. with a relatively high pressure.

Swiss Patent CH 262 232 discloses a tap for an apparatus for the preparation of espresso coffee which comprises a cylinder communicating with the lower portion of the boiler and containing a hollow piston adapted to be raised in opposition to a spring, allowing the water to enter the piston, and to be lowered under the action of the spring in order to expel the water through the base of the cylinder formed by a detachable filter adapted to contain the ground coffee.

U.S. Pat. No. 2,878,747 discloses a coffee machine which includes a boiler for boiling water, a coffee percolator borne by a support bracket and comprising an infusion chamber, a cylinder above the chamber having an inlet, a duct connecting the inlet with the boiler to enable boiling water to be conveyed into the cylinder, and a piston moving in a reciprocating manner in the cylinder in order to control the inlet and force the boiling water into the infusion chamber when the piston is lowered.

U.S. Pat. No. 3,119,322 discloses a coffee machine which has a container for the infusion of the water, a pump for generating pressure in the container, an electric motor for supplying the pump and coffee preparation units connected to the container which have simple distribution cocks, a rotary shaft disposed along the units and provided with cams, a switch in the motor circuit positioned such that it can be actuated by the shaft, in which the cocks have manual operation levers each positioned so as to engage one of the cams in order to rotate the shaft which actuates the switch and starts the motor.

In order to counter the greater thrust of the water in the infusion chamber as a result of mechanical systems, the coffee is generally finely ground so as to increase the overall contact surface with the water and improve the extraction of the beverage while using smaller quantities of ground coffee.

With the development of hydraulic devices to increase the pressure of the water supplied to the infusion chamber without having to vary the temperature, it has been possible to generate high pressures of as much as 10 bar or more. It has nevertheless been observed that the use of a pressure above 10 bar may have adverse effects. Raising the pressure beyond a certain value makes it necessary in practice to grind the coffee very finely and thus to refine the filters with the result that the excessively fine grinding could ultimately cause the filter to become obstructed leading to problems of high stresses on the sealing members and ducts, thereby worsening the quality of the beverage.

Patent application EP 1210893 discloses a coffee extraction device in a machine dispensing drinks in cups, in which the coffee is produced by supplying the hot water to a cylinder provided with a piston in which the raw material is loaded in order to pressurise the interior of the cylinder so as to percolate and extract the concentrated solution through a filter. The apparatus is provided with a pump for the hot water and means for controlling the pump apt to vary the quantity of hot water supplied to the cylinder.

U.S. Pat. No. 3,230,974 discloses a distribution head for a coffee machine which allows for an infusion time interval between the opening of the cock and the distribution of the beverage. In practice, before applying the thrust to obtain the pressure value needed to dispense the coffee, the ground coffee powder is filled for a certain period of time with water at a pressure lower than the dispensing pressure, for example 1.5 bar.

Typically, in current preparations of espresso or filter coffee, the temperature of the water supplied to the infusion chamber is between approximately 88 and 98° C. and in some machines the pressure varies from approximately 0.8 to 1.5 bar in the initial infusion period and is then increased to approximately 9 bar during the extraction of the beverage.

Patent Application EP 0934719 discloses a method for preparing an espresso coffee from a predetermined dose of coffee powder through which a predetermined quantity of hot water is passed under the action of a pump at a given maximum pressure, which comprises a preliminary step during which the dose of coffee powder is wetted by an initial quantity of hot water at a pressure below the given maximum pressure for a certain period of time.

The size of the ground coffee grains is a variable which determines the final result of the beverage.

Patent application WO 2009/010190 discloses a method for controlling a coffee machine grinder comprising a step of measuring the actual value of a physical quantity relating to the percolation process and a step of modifying the ground coffee grain size at least for the next percolation so that a possible detected deviation between the actual value measured and a reference value for the physical quantity is compensated. The physical quantity may be the percolation flow, the percolation time or the hydraulic pressure in the percolation circuit.

As coffee prepared by the extraction method has spread throughout the various countries, it has been adapted to existing tastes and customs. Generally, a distinction is made between an espresso coffee (Mediterranean) dispensed into a cup in a quantity which may typically vary from 15 to 25 cm$^3$ and a "café creme" dispensed into a cup in a quantity which may typically vary from 100 to 120 cm$^3$, the total dispensing time being roughly equal in both cases, for example 25 seconds. There are obviously many variants within these two kinds of coffee.

In order to obtain the desired quantity of a particular kind of coffee in the same dispensing time, the flow of the water to be dispensed has to be varied by adapting the fineness of the grinding in order to change the resistance with which the coffee contained in the filter opposes the passage of the water.

By their nature, coffee blends differ in terms of their quality, consistency, fat content, degree of roasting and humidity. A variation even in only one of these properties makes it advisable to correct the fineness of the grinding in order to keep the flow of dispensing water characterising a given type of coffee constant. On the other hand, it is difficult accurately to control the grinding process and the resulting ground compound is generally formed by a distribution of small grains whose shape and dimensions vary. As a result, a dose of ground coffee taken from the grinder is never exactly the same as another, causing the resistance with which the ground coffee opposes the water to fluctuate around the optimum value and therefore a variation in the rate of flow of the water with a resulting variation in the pressure of the water during dispensing. The dispensing time may be taken as a reference parameter for the resistance opposed by the water. If the coffee is too finely ground, the water will take a long time to pass through the powder leading to excessive extraction which gives the beverage an unpleasant taste. If the coffee is too coarsely ground, the water passes through the powder rapidly without managing to extract much of the substances.

The Applicants have observed that, preferably, once a nominal reference value for the dispensing time, $t_e$, has been determined, for example from an evaluation of the statistical type of the quality of the beverages resulting from a number of dispensing operations, the dispensing time, $t_e$, should not vary from a given nominal value outside a certain variability interval. For example, if $t_e^o$ is 25 seconds, $t_e=25\pm1$ s with a maximum standard deviation of +3 seconds. A dispensing time outside the variability interval may indicate that an "anomalous" resistance with which the content of the filter is opposing the water and therefore that the quality of the resulting beverage may have deteriorated.

The Applicants have observed that it would be advantageous in particular to be able to dispense the beverage in a controlled manner, and possibly to act on the water pressure in response to a variation in the grain size of the coffee.

An object of the present invention is to provide a coffee machine able to dispense beverages prepared from different blends of raw material and/or ground to different finenesses and/or defined by different preparation processes.

A further object of the present invention is to provide a coffee machine which makes it possible to control the whole cycle of pressurisation of the coffee during dispensing by acting on the value of the flow of water in order to enable a regulation of the preparation of the beverage with a view to ensuring a high quality beverage.

According to an aspect, the present invention is directed to a coffee machine comprising a dispensing pressure control system. The "dispensing pressure" is intended the pressure of the water supplied to the filter unit which contains the ground coffee.

The present invention relates in particular to a coffee machine for producing and dispensing coffee-based beverages comprising a hydraulic pump, at least one dispensing device comprising a filter unit apt to contain coffee powder and a supply unit apt to introduce water into the filter unit when the filter unit is connected to the supply unit and a hydraulic circuit which brings the hydraulic pump into fluid communication with the supply unit of the dispensing device, the hydraulic circuit comprising a supply duct which supplies hot water under pressure to the supply unit. The coffee machine further comprises a dispensing pressure control system which comprises a control unit, a pressure sensor disposed along the hydraulic circuit and apt to generate a control signal representative of the pressure detected, the pressure sensor being electronically connected to a control unit in order to detect the dispensing pressure, and a hydraulic variable-flow valve disposed along the hydraulic circuit and apt to supply variable quantities of water to the at least one dispensing device, the variable-flow valve being actuatable by an electronic drive controlled electronically by the control unit in order to regulate the output flow rate of water as a function of a detected dispensing pressure value.

The present invention relates, moreover, to a method of controlling the dispensing pressure in a coffee machine.

The present invention relates in particular to a method for controlling the dispensing pressure in a coffee machine for producing and dispensing coffee-based beverages including at least one dispensing device comprising a filter unit apt to contain coffee powder, the method comprising: supplying water to a hydraulic circuit in fluid communication with the at least one dispensing device and comprising a variable-flow valve apt to supply variable quantities of water to the at least one dispensing device; supplying a predetermined quantity of water corresponding to at least one nominal dispensing pressure value from the variable-flow valve, the variable-flow valve being actuatable by an electronic drive which controls the flow rate of water output from the valve; detecting at least one water dispensing pressure value by a pressure sensor disposed along the hydraulic circuit and, if the at least one detected value of the dispensing pressure deviates from the at least one nominal pressure value, regulating the flow rate of water supplied by the variable-flow valve as a function of the at least one detected pressure value.

In the present description and the accompanying claims, "infusion" indicates the step of wetting of the coffee powder contained in the filter and "extraction" indicates the step of using the technical process which forces the hot water under pressure through the ground coffee.

The infusion step generally takes place at pressure lower than the extraction pressure. The dispensing step indicates the overall step of preparation of the beverage including both the infusion and the extraction steps.

The present invention will be described in further detail below with reference to the accompanying drawings in which some but not all of its embodiments are shown. The drawings illustrating the embodiments are diagrammatic representations and are not to scale. In the drawings.

Figure 5A:
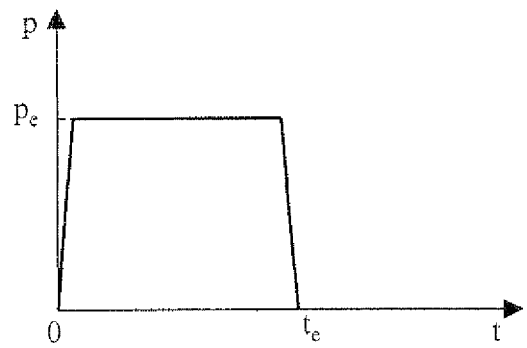
Figure 5B:
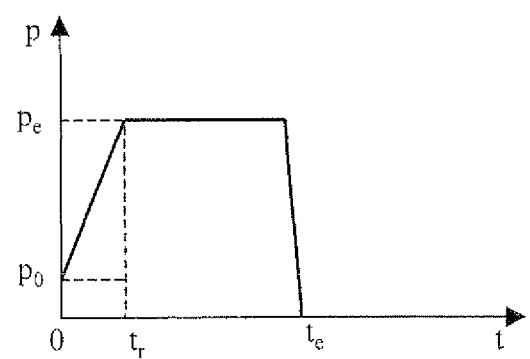
Figure 5C:
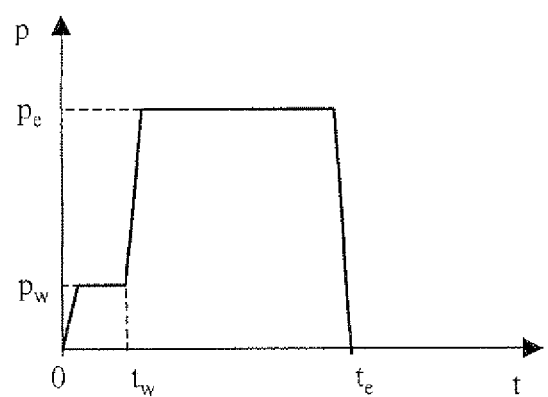

FIGS. 5*a* to 5*c* are graphical representations of the water pressure as a function of time for a single dispensing step, according to some embodiments of the invention.

Figure 1:
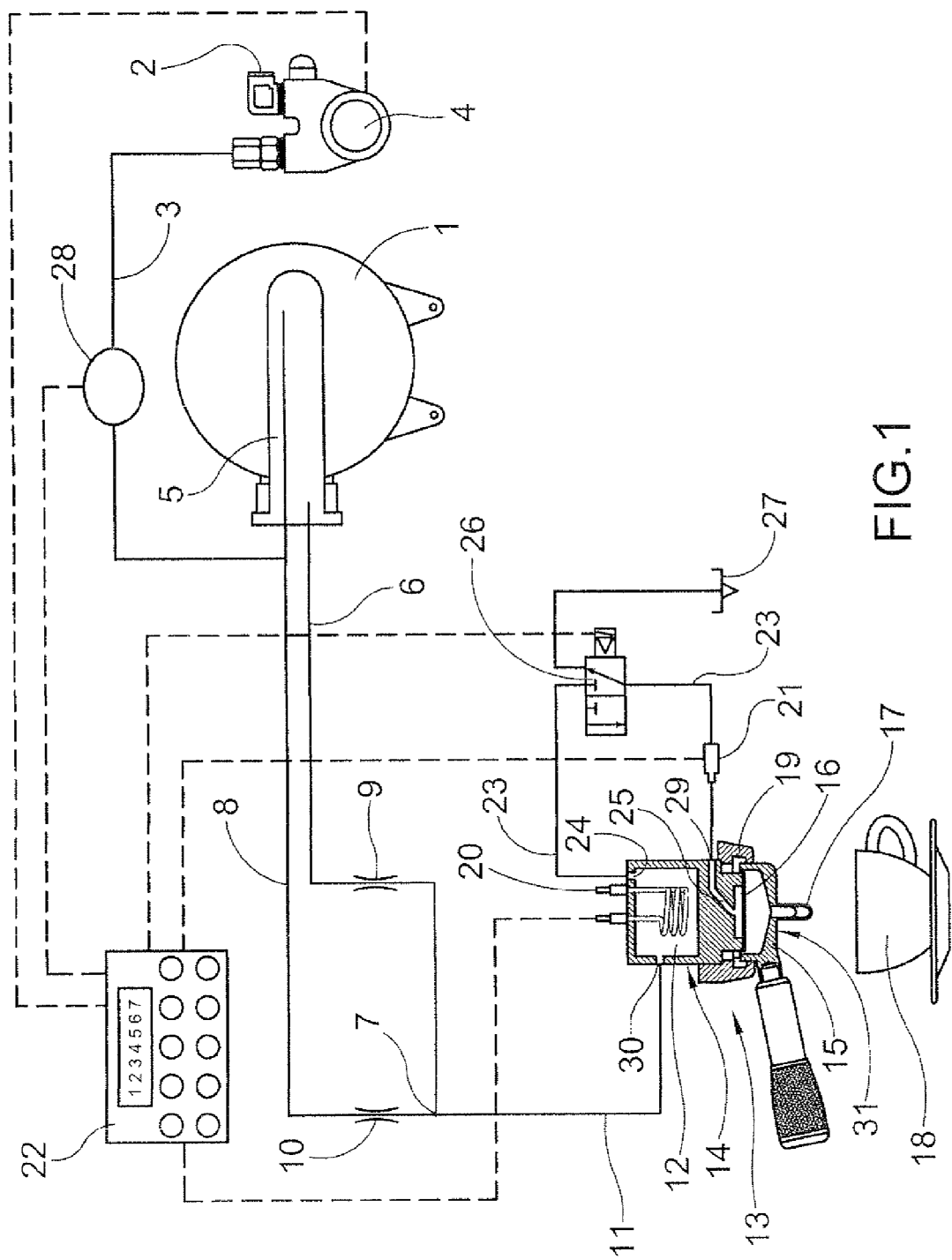
FIG. 1 shows a hydraulic circuit and a control circuit comprised in a coffee machine.

FIG. 1 is a diagram of a hydraulic circuit for an espresso coffee machine which supplies a coffee dispensing device shown overall by 13. A conventional boiler 1 for the production of hot water and steam is supplied in a conventional manner (not shown in the figure) by an external water source of cold water 2. The water source 2, by means of a duct 3 and a hydraulic pump 4, supplies a heat exchanger 5, also conventional, disposed within the boiler 1. The hydraulic pump 4 is a motor pump actuated by an electronic drive.

The output of the heat exchanger 5 supplies heated water via a duct 6 to a mixing point 7 which is also reached by a duct 8 connected to the duct 3 supplying cold water.

Flow calibrators, shown by 9 and 10 respectively, are optionally included on the hot water duct 6 and on the cold water duct 8, upstream of the mixing point 7.

These flow calibrators make it possible to regulate the quantity of cold with respect to hot water so as to obtain a flow of mixed water in the supply duct 11 at a supply temperature T1. Downstream of the mixing point 7, the mixed water reaches the dispensing device 13.

The dispensing device 13 comprises a supply unit 14 for discharging the water under pressure to a filter unit 31 which comprises a filter-holder 15, a filter 16 and a nozzle 17 for dispensing the coffee under which a collection cup 18 is disposed in operation. In the shown example, the supply unit 14 includes a heating chamber 12, in the form of a small boiler, and a dispensing duct 25 obtained in the supply unit 14 and, in this particular example, in the structure acting as the base of the heating chamber, the duct communicating immediately upstream of the filter 16.

Connection means 19 are provided on the supply unit 14 for the detachable connection of the filter-holder 15.

The plurality of ducts which bring the pump into fluid communication with the dispensing device, and in particular with the filter unit, form a hydraulic circuit.

In the heating chamber 12 an electrical resistance 20 is provided for heating the water to a dispensing temperature T2 suitable for the formation of the coffee beverage, which temperature is greater than the temperature T1 of the water downstream of the mixing point 7 which acts as a source as regards the heating chamber 12.

The hot water under pressure is caused to flow through the supply duct 11 to the heating chamber 12 via the inlet 30, in which chamber is stabilised in temperature, and is then introduced into the filter unit 31. More particularly, the water is introduced into the filter-holder 15 via a duct 23 which connects the outlet 24 of the heating chamber 12 to the inlet 29 of the dispensing duct 25.

The duct 23 is provided with an electrovalve 26 which has two operating positions. This electrovalve 26, in one position, causes the water to be supplied to the filter-holder and thus the formation of the beverage, and in the other position it discontinues the supply of the water and communicates with a discharge 27 external to the machine.

A pressure sensor 21 is disposed along the hydraulic circuit in fluid communication with the pump and the dispensing device. The pressure sensor is preferably disposed along the connection duct 23 which supplies the water under pressure from the heating chamber 12 to the dispensing duct 25, upstream of the electrovalve 26 or downstream of the electrovalve 26, in the vicinity of the inlet 29 of the duct 25. In a particular preferred embodiment, the pressure sensor is disposed upstream of the intercepting electrovalve in order to prevent any ground coffee residue from the dispensing duct from soiling the sensor.

The pressure sensor 21 is apt to generate a control signal representative of the water pressure and is connected to a control unit 22 such as an electronic central processing unit (CPU). The pressure sensor is, for example, a transducer which supplies the control unit 22 with a signal proportional to the pressure of the water reaching the dispensing device and in particular the filter unit 31.

The operating positions of the electrovalve 26 are preferably controlled by the control unit 22.

The control lines through which the control signals from and to the control unit 22 pass are shown by dashed lines in the drawings.

In a preferred embodiment, the water supplied to the inlet 30 of the heating chamber 12 from the supply duct 11 downstream of the mixing point 7 is already at a relatively high supply temperature T1 (for example not lower than approximately 80° C.) and therefore the heating time needed to reach the optimum temperature T2 for the formation of the beverage (for example, approximately 90° C.) is short, thereby reducing the time needed for the preparation of the beverage and in particular eliminating waiting times between the dispensing of one dose of coffee and the following dose as a result of having to wait for the water to reach the required temperature. According to an embodiment, the temperature T1 is from 10 to 20° C. lower than the temperature T2.

In the case of a relatively high temperature T1, the electrical power needed for the electrical resistance 20 to start and to stabilise the temperature to the temperature T2 for the preparation of the beverage is relatively low, for example not higher than 0.8 kW, even when dispensing relatively large quantities of beverage, for example from 120 to 250 cm$^3$.

The operation of the heating resistance 20 is preferably controlled by a temperature sensor (not shown in the figure) in contact with the water in the heating chamber in order to detect the dispensing temperature T2 and is logically connected to the CPU 22.

The hydraulic circuit is preferably provided with a flow rate measurement device 28 apt to measure the flow of water passing through it. The device 28 is connected to the control unit 22 to which it sends a signal representative of the measured flow rate of water. For example, the device 28 supplies the control unit 22 with electrical pulses whose number is proportional to the quantity of water passing though it in accordance with a metering constant expressed in cm$^3$/pulse.

In an embodiment, the device 28 is of the type disclosed in British Patent Application GB 2 008 540.

In the embodiment of FIG. 1, the device is disposed on the cold water duct 3 downstream of the pump 4. The frequency with which the control unit receives these pulses is directly proportional to the flow rate of water supplied to the hydraulic circuit by the pump 4 and therefore to the dispensing device.

In the machine shown in FIG. 1, the pump 4 is actuated at variable speed by an electronic drive (for example a variable speed drive, VSD) via which the speed of rotation of the pump may be varied. The pump is, for example, actuated by a variable frequency electronic drive, whose frequency variation corresponds to a variation of the speed of rotation of the pump. In this way it is possible to vary the flow of water supplied by the pump to the duct 3 and therefore the water pressure. The quantity of water supplied to the hydraulic circuit corresponding to one dispensing operation, or in one dispensing step, depends on the type of coffee, for example 20 cm$^3$ for an espresso coffee.

The pump, or the electronic control unit connected to the pump motor, is connected to the control unit 22 which regulates the speed of rotation of the pump and therefore the pressure of the water supplied to the hydraulic circuit.

A flow of water and a "nominal" pressure of the water supplied to the hydraulic circuit correspond to a speed of rotation of the pump actuated for a given period of time. The "actual" dispensing pressure is measured by the pressure sensor, preferably in the vicinity of the dispensing device. A deviation between the nominal pressure and the actual pressure may indicate an "anomalous" dispensing and therefore a possible deterioration of the quality of the beverage.

The flow of water supplied by the pump as a function of the dispensing pressure detected may be regulated manually by an operator and/or by means of an automatic regulation in which the signals received by the pressure sensor and the electronic control device of the pump form a feedback loop controlled by the control unit.

Preferably, the system for controlling pressure included in the coffee machine enables automatic regulation of the dispensing pressure, in which the signals received by the pressure sensor, the electronic control device of the pump and the water flow rate measurement device form a feedback loop.

At the beginning of a dispensing operation, for example, the pump 4 is started with a certain speed of rotation corresponding to the supply of a predetermined flow of water to the hydraulic circuit and therefore to a nominal dispensing pressure value, for example 9 bar. The water supplied by the pump passes through the flow measurement device 28 which measures its actual rate of flow (for example in $cm^3/s$). If the control unit detects, from the flow measurement device, a flow which is too low or in general below the flow corresponding to the nominal pressure (for example the frequency of the pulses received by the device is too low), the dispensing operation is taking place more slowly, because, for example, the coffee in the filter is too finely ground, leading to an increase in the dispensing time with respect to the nominal dispensing time, for example 25 seconds. If, on the other hand, the control unit detects a flow which is too high, the dispensing operation is taking place too rapidly, because, for example, the coffee in the filter is too coarsely ground, leading to a reduction of the dispensing time with respect to the nominal dispensing time. When it detects a flow which does not correspond to the optimum flow value, the control unit adjusts the speed of rotation of the pump until the flow reaches the optimum value. The control unit also receives the actual dispensing pressure value. The control unit stops the pump when the quantity of water which has passed through the flow rate measurement device is equal to the quantity of water corresponding to one dispensing operation.

It is also possible for the pressure to have a predetermined value or to follow a predetermined curve of values during the dispensing operation.

The control unit may be operationally associated with a display and an input device such as a keyboard which may be operated by an operator in order to control and/or modify the flow of water supplied to the hydraulic circuit and therefore the dispensing pressure.

The above description, referring to FIG. 1, relates to a coffee machine with a single dispensing unit. If the coffee machine comprises a plurality of dispensing units, the speed of rotation of the hydraulic pump may be controlled by providing each dispensing unit with a hydraulic pump in fluid communication with its respective dispensing unit.

However, providing a coffee machine with a plurality of hydraulic pumps may significantly increase the costs of producing and maintaining the machine and may not therefore be desirable. Moreover, the inclusion of a plurality of pumps generally increases the overall bulk within the machine, making it more difficult to produce compact machines.

Again with reference to the hydraulic circuit of FIG. 1, the use of a single hydraulic pump to supply water to more than one dispensing device, i.e. to a plurality of dispensing devices, is envisaged. If, for example, in a machine with two dispensing devices it is wished to dispense a coffee from the first of the two dispensing devices when the second is already in operation and the pump has therefore already been started, it would be difficult to independently select the dispensing of the beverage from the two devices or even to enable correct dispensing from one of the devices. For example, if it is wished to cause a step of infusion to precede the step of extraction of the beverage from the second dispensing device, it is not possible to delay the start of the pump because it would be necessary to stop the pump thereby altering the dispensing operation which is already underway from the first dispensing device.

The Applicants have realised that, in a coffee machine with a plurality of dispensing devices, if the hydraulic circuit of each dispensing device is provided with a hydraulic valve whose output flow rate of water can be regulated, it is possible to provide a system for controlling the dispensing pressure which is able to control the supply from each dispensing device in an independent manner.

Figure 2:
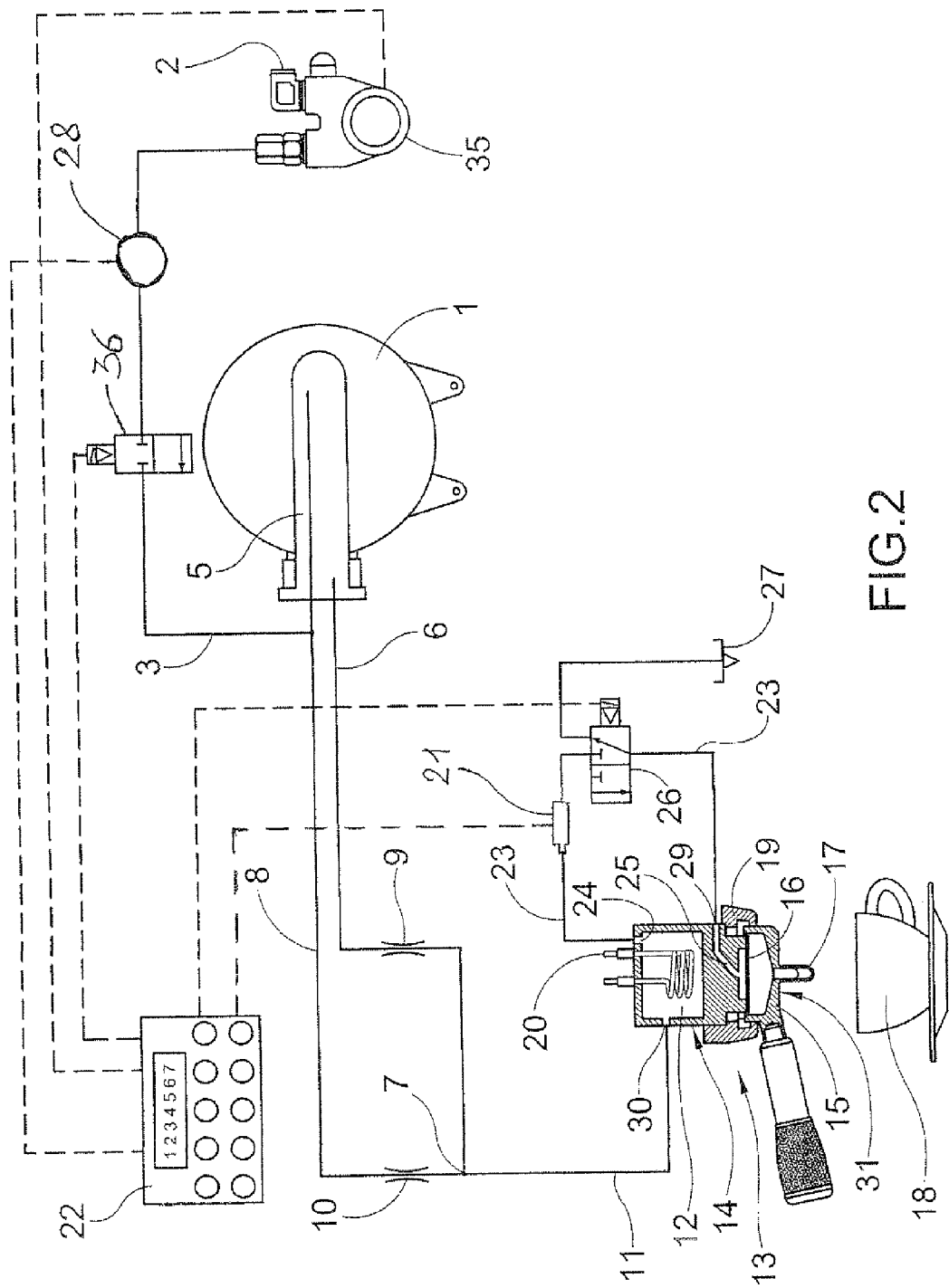
FIG. 2 shows a hydraulic circuit and a control circuit comprised in a coffee machine comprising at least one dispensing device, in a first embodiment of the present invention.

FIG. 2 is a diagram of a hydraulic circuit and a control circuit included in a coffee machine according to a second embodiment of the present invention. Identical reference numerals are used for components identical to or performing similar functions to the components of FIG. 1. The embodiment of FIG. 2 differs from the embodiment of FIG. 1 chiefly in that it comprises a hydraulic pump 35 which is not necessarily of variable speed. In one embodiment, the pump 35 has a fixed flow rate and is for example actuated by a motor at a constant speed of rotation which supplies water at a constant pressure thrust. The motor may be coupled to an electronic control device connected to the control unit 22 which controls the actuation and de-activation of the pump.

In one embodiment, the hydraulic pump 35 may be actuated at variable speed, enabling the value of the speed of rotation set during the operation of the machine to be controlled. This may be advantageous if it is wished to set an appropriate value for the speed of rotation of the pump which takes account, in addition to the thrust needed for dispensing, of the load losses on the valves operating along the hydraulic circuit.

A hydraulic variable-flow valve 36 is disposed along the hydraulic circuit which brings the hydraulic pump into fluid communication with the dispensing device 13. The valve is driven by an electronic drive connected to the control unit 22 which controls the flow of water through the valve. The control unit in particular regulates the flow rate of water output from the valve, thereby making it possible to control the pressure introduced into the supply duct of the hydraulic circuit and therefore into the dispensing device.

In preferred embodiments, the valve 36 is a proportional electrovalve. The proportional electrovalve is driven, for example, by an electronic drive used to regulate a variable throttle which controls the flow output from the valve by varying the input voltage of the electronic drive. The voltage is regulated by the control unit.

The control unit 22 monitors the pressure of the water supplied to the dispensing device by means of the pressure sensor 21. The electronic drive of the variable-flow valve actuates the outlet opening and is controlled by the control unit to select a predetermined outlet opening value, e.g. a predetermined value of the cross-section to the flow of water passing through the outlet opening, so as to maintain the pressure at a certain predetermined value within a time interval, or to vary the outlet opening within the time interval so that the water pressure during the dispensing operation follows a predetermined curve.

In a machine of this type, by monitoring the dispensing pressure, it is possible to adjust the value of the pressure when the coffee dispensing step is taking place by acting on the output of flow rate of water from the flow regulation valve 36 by means of the control unit 22. It is also possible to program, through the control unit 22, the dispensing operation to take place in accordance with a predetermined pressure curve which may be chosen depending on the type of coffee that it is desired to obtain.

It is also possible to control, and if necessary, to adjust the value of the dispensing pressure, at least for the next dispensing operation and in some embodiments during the dispensing operation itself.

In preferred embodiments, the machine comprises a flow rate measurement device 28. During the dispensing step, by monitoring the flow rate of water detected by the device 28, the control unit 22 can modify the opening of the flow regulation valve in order to increase or decrease the quantity of water urged by the pump into the dispensing device as a function of the optimum flow rate desired for a certain kind of coffee, possibly correcting adverse effects caused by a variation in the grain size of the coffee powder and/or the type of coffee (e.g, blend).

It will be appreciated that the present invention is not limited to a particular manner of supplying hot water at a dispensing temperature to the dispensing duct.

For example, in one embodiment, the heating chamber receives water at ambient temperature which is heated to the temperature T2 by the resistance disposed in the heating chamber. In this embodiment, the hot water duct 6, which conveys the water from the heat exchanger to be mixed with the cold water from the duct 8 upstream of the heating chamber, is omitted and the heating chamber is supplied solely by the water from the duct 8.

Again by way of example, in one embodiment the dispensing device does not comprise a heating chamber and the supply duct in fluid communication with the dispensing device supplies water under pressure at the dispensing temperature to the supply unit.

The valve 36 is preferably disposed along the cold water duct 3, more preferably downstream of the flow rate measurement device 28. The present invention includes an embodiment in which the valve 36 is disposed upstream of the flow rate measurement device.

In a different embodiment (not shown), the pressure sensor is disposed along the supply duct 11.

In a further embodiment (not shown), the pressure sensor is disposed in the heating chamber 12.

In general, it is preferable for the pressure sensor to measure the actual pressure of the water supplied to the filter unit. The sensor is preferably disposed in the proximity of the dispensing device.

The regulation of the flow rate of water supplied by the variable-flow valve as a function of the detected dispensing pressure can be carried out manually by an operator and/or by means of automatic regulation in which the signals received by the pressure sensor and the electronic drive of the variable-flow valve form a feedback loop controlled by the control unit.

Preferably, the pressure control system contained in the coffee machine enables automatic regulation of the dispensing pressure, in which the signals received by the pressure sensor, by the electronic drive of the variable-flow valve and by the water flow rate measurement device form a feedback loop.

For example, at the start of a dispensing operation, the variable-flow valve 36 is actuated in order to supply a predetermined flow rate of water to the dispensing device; for example, the control unit selects a given cross-section of the outlet opening of the valve corresponding to a nominal dispensing pressure value, e.g. 9 bar. Upstream or downstream of the variable-flow valve, the water supplied by the pump passes through the flow measurement device which measures its actual rate of flow (for example in $cm^3/s$). As the flow rate measurement device is disposed along the hydraulic circuit in fluid communication with the dispensing device, the flow rate of water which passes through it is affected by the dispensing process which is taking place in the dispensing device.

If the control unit detects, from the flow rate measurement device, a flow which is too low or in general below that corresponding to the nominal flow rate (for example, the frequency of the pulses received by the device is too low), the dispensing operation is taking place more slowly, because, for example, the coffee in the filter is too finely ground, leading to an increase in the dispensing time with respect to the nominal dispensing time, e.g. 25 seconds. If, on the other hand, the control unit detects a flow rate which is too high, the dispensing operation is taking place too rapidly, because, for example, the coffee in the filter is too coarsely ground, leading to a reduction of the dispensing time with respect to the nominal dispensing time. When it detects a flow rate which does not correspond to the optimum flow rate value, the control unit adjusts the outlet opening of the variable-flow valve until the flow rate reaches the optimum value. The control unit also receives the actual dispensing pressure value. The control unit closes the opening of the valve when the quantity of water metered by the flow measurement device is equal to the quantity of water corresponding to one dispensing operation. The regulation of the flow rate of water causes the dispensing time to be substantially equal to the nominal dispensing time, for example 25 s±1 s.

Figure 3:
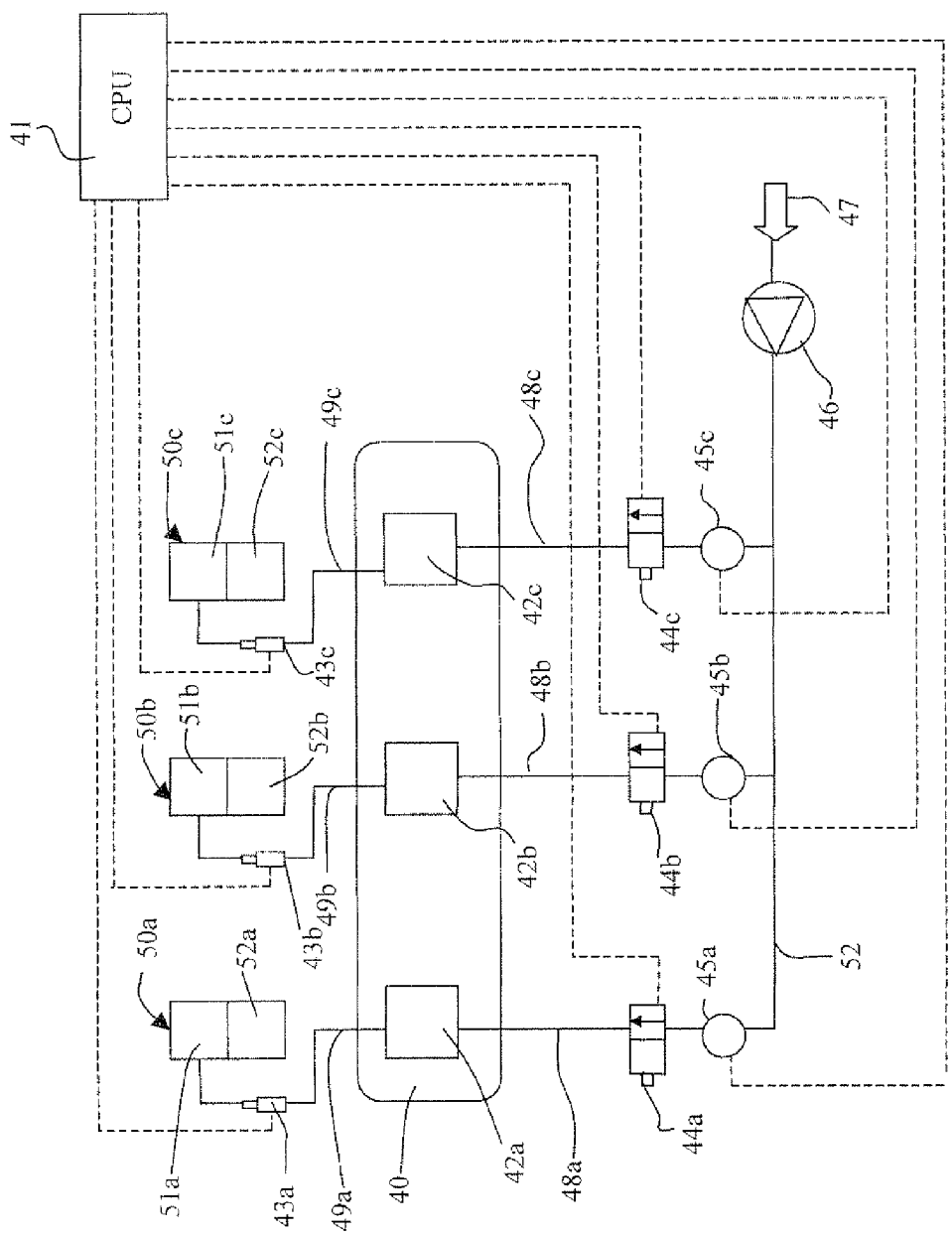
FIG. 3 shows a hydraulic circuit and a control circuit comprised in a coffee machine comprising a plurality of dispensing devices, in a second embodiment of the present invention.

FIG. 3 shows a hydraulic circuit and a control circuit comprised in a coffee machine according to a further embodiment of the invention. The coffee machine of FIG. 3 comprises a plurality of dispensing devices 50a, 50b and 50c. The number of dispensing devices is no more than indicative and the present invention is not limited to a particular number of dispensing devices. Each dispensing device 50a, 50b and 50c comprises a respective supply unit 51a, 51b and 51c and a respective filter unit 52a, 52b and 52c. A flow of water 47 from a water source (not shown) reaches a hydraulic pump 46 which supplies water to a source duct 52. A plurality of cold water ducts 48a, 48b and 48c lead from the source duet 52 and supply water in parallel to the respective dispensing devices 50a, 50b and 50c. Each cold water duct 48a, 48b and 48c supplies a respective heat source, for example a respective heat exchanger 42a, 42b and 42c disposed within a common saturated water steam boiler 40. It will be appreciated that the heat sources may be independent primary heaters, for example of the type disclosed in WO 91/07898.

At the outlet of each heat exchanger 42a, 42b and 42c, a respective supply duct 49a, 49b and 49c supplies hot water to the respective dispensing device, in particular to the respective supply unit 51a, 51b and 51c.

Each cold water duct 48a, 48b and 48c is provided with a respective hydraulic variable-flow valve 44a, 44b and 44c, preferably a proportional electrovalve, connected to a control unit 41 which controls the flow of water introduced into the heat exchanger and then to the supply duct of the respective dispensing device.

Preferably, a respective flow rate measurement device 45a, 45b and 45c is disposed along each cold water duct, preferably upstream of the valve 44a, 44b and 44c. Each cold water duct supplies a respective heat exchanger 42a, 42b and 42c within a boiler 40.

A respective pressure sensor 43a, 43b and 43c is disposed in each supply duct 49a, 49b and 49c and is connected to the control unit 41 which receives the signals representative of the detected dispensing pressure supplied by the pressure sensors.

Although not shown in the drawings, in which the structural details of the dispensing device are not shown, each supply unit 51a, 51b and 51c comprises a dispensing duct which supplies hot water under pressure to the filter unit. In one embodiment, the supply unit comprises a dispensing duct obtained in the body of the supply unit. The water reaches the dispensing duct from the respective supply duct 49a, 49b and 49c at a given dispensing temperature.

In a machine embodied in this way, it possible to regulate the value of the pressure during the dispensing step of the coffee for each dispensing device by acting on the flow rate of water output from the variable-flow valve via the control unit 41. It is also possible to program, again via the control unit 41, the dispensing operation to take place according to a predetermined pressure curve which may be selected as a function of the type of coffee which it is desired to obtain.

Figure 4:
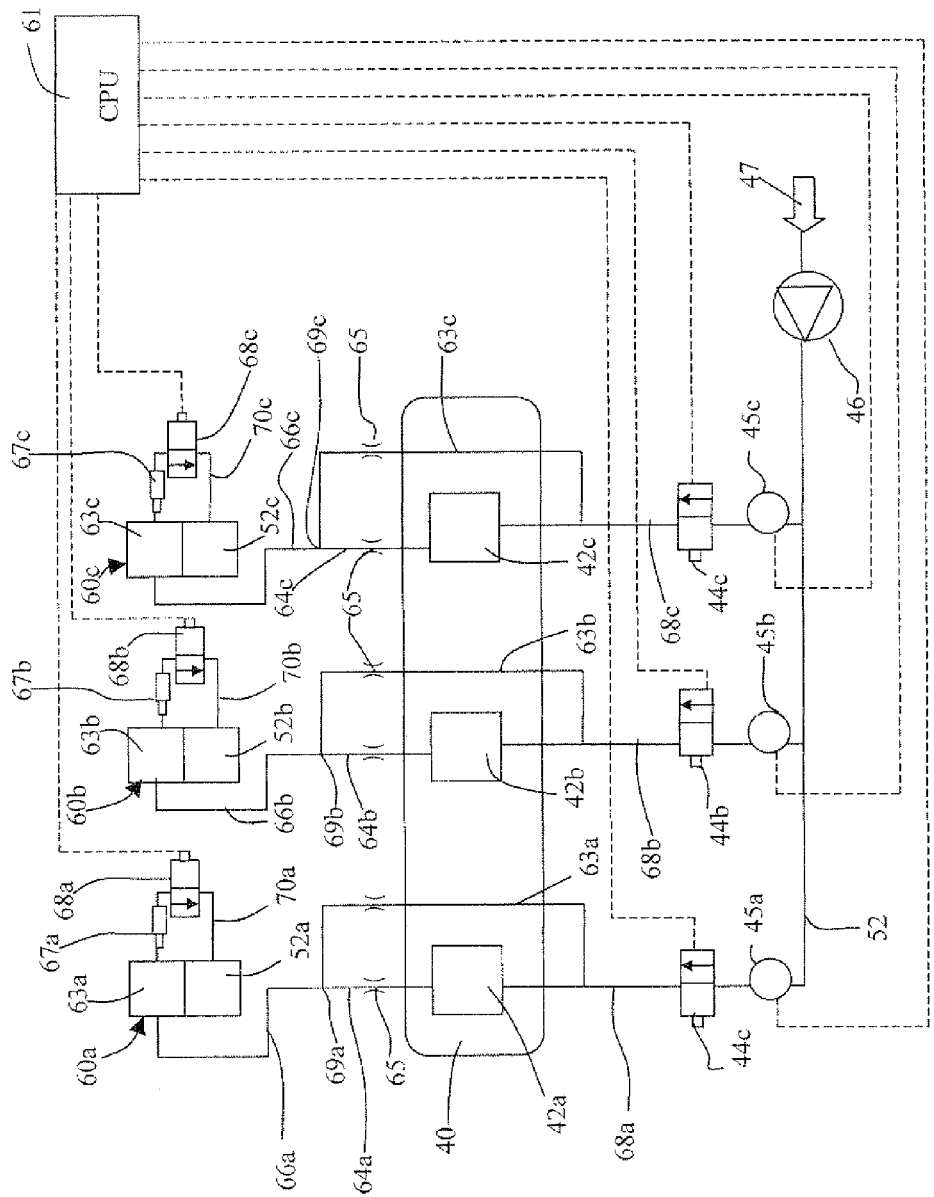
FIG. 4 shows a hydraulic circuit and a control circuit contained in a coffee machine having a plurality of dispensing devices, in a third embodiment of the present invention.

FIG. 4 is a diagram of a hydraulic and control circuit for a coffee machine comprising a plurality of dispensing devices according to a further embodiment of the present invention. Identical reference numerals are used for components identical to or having equivalent functions to the components of FIG. 3.

A plurality of cold water ducts 68a, 68b and 68c, each provided with a respective variable-flow valve 44a, 44b and 44c, lead from the source duct 52. Each variable-flow valve is apt to generate a control signal representative of the flow of water supplied to the respective dispensing device and is connected to a control unit 61 such as a CPU.

The outlet of each heat exchanger 42a, 42b and 42c, via a respective duct 64a, 64b and 64c, supplies heated water to a respective mixing point 69a, 69b and 69c which is also supplied by a respective cold water supply duct 63a, 63b and 63c connected to the duct 68a, 68b and 68c.

Flow calibrators shown by 65 are preferably included in each hot water duct 64a, 64b and 64c and in each cold water duct 63a, 63b and 63c, upstream of the respective mixing point 69a, 69b and 69c.

These flow calibrators make it possible to adjust, for example when starting to use the machine, the quantity of cold with respect to hot water in order to obtain a flow of mixed water in the supply duct at a supply temperature. Downstream of each mixing point 69a, 69b and 69c, the mixed water is supplied to the respective dispensing device 60a, 60b and 60c. Each dispensing device 60a, 60b and 60c comprises a respective supply unit 63a, 63b and 63c and a respective filter unit 52a, 52b and 52c connected in a detachable manner to the corresponding supply unit.

In one embodiment, each dispensing device 60a-60c is of the type shown in FIGS. 1 and 2. In this embodiment, each supply unit comprises a heating chamber (structural details of the dispensing devices are not shown in FIG. 4) which is supplied with water at the supply temperature by the respective supply duct 66a, 66b and 66c. The water is heated to the dispensing temperature by heating means contained within the heating chamber of each supply unit 63a, 63b and 63c and is supplied to a respective connection duct 70a, 70b and 70c to the respective filter unit via a dispensing duct which communicates immediately upstream of a filter included in the filter unit.

An intercepting electrovalve 68a, 68b and 68c is disposed on the respective connection duct 70a, 70b and 70c, and has at least two operating positions: a first position in which water is supplied to the dispensing duct of the filter unit and a second position in which the supply is cut off.

A respective pressure sensor 67a, 67b and 67c is disposed along each connection duct 70a, 70b and 70c, preferably upstream of the respective intercepting valve 68a, 68b and 68c, each sensor being apt to measure the dispensing pressure of the respective dispensing device. Each pressure sensor is connected to a control unit 61 which receives the data relating to the pressure measured by the sensors.

The intercepting valves 68a, 68b and 68c are preferably controlled by the control unit 61 which controls their operating positions.

According to a particular feature, the invention relates to a method for controlling the hydraulic pressure of the water supplied to the dispensing device of a coffee machine.

FIGS. 5a to 5c are graphical representations of the water pressure as a function of time for a single dispensing step, according to various embodiments of the invention.

FIG. 5a shows a curve of the pressure within the dispensing time interval equal to $t_o$ for dispensing the beverage from a dispensing device. In this example, once the pressure value $p_e$ during dispensing of the beverage has been set, the control unit controls the electronic drive to open the variable-flow valve (e.g. with reference to FIG. 2, valve 36) to a predetermined cross-sectional value of the outlet opening. This value corresponds to a predetermined beverage extraction pressure $p_e$, for example 9 bar. The pressure reaches the operating value as soon as the speed of the pump reaches the predetermined value, typically in a time which is negligible with respect to the dispensing time $t_e$. The pressure curve is monitored by the control unit which receives the data supplied by the pressure sensor. If necessary, the control unit adjusts the cross-section of the outlet opening of the valve if the pressure value does not correspond to a certain target value or if the quality of the product is altered, for example as a result of variations in the grain size of the ground coffee. In this way, for example, subsequent dispensing of the beverage may be carried out with correct parameters.

In the example of FIG. 5b, the extraction pressure value $p_e$ is reached in a time $t_r$ with a gradual increase in the pressure from an initial value $p_0$. The pressure curve of FIG. 5b may be achieved by graduating the opening of the variable-flow valve in accordance with a curve of opening cross-sectional values which can be programmed by means of the control unit up to a cross-sectional value corresponding to a given extraction pressure value $p_e$. The acceleration profile may be selected so that it is apt to the coffee blend being used and/or the type of beverage to be dispensed. The pressure curve during dispensing is controlled by means of the pressure sensor which sends the data to the control unit, the latter carrying out, where necessary, adjustments by acting on the outlet opening of the variable-flow valve. The control unit preferably receives the data from the flow rate measurement device and, where necessary, adjusts the curve of opening of the variable-flow valve as a function of the data received from both the pressure sensor and the flow rate measurement device.

The pressure curve shown in FIG. 5c represents a dispensing step which comprises an initial step of wetting followed by a step of extraction. During an initial time period $t_w$ the dispensing duct of the dispensing device supplies water at a pressure having a first, relatively low, value, $p_w$ (wetting step). At the time $t_w$ the pressure is increased to a second value $p_e$ greater than the first value $p_w$ the second value representing the extraction pressure (extraction step). The extraction step takes place for a predetermined time ($t_e-t_w$) where $t_e$ is the total dispensing time. The curve of FIG. 5c shows the case in which the pressure changes rapidly (with respect to the time $t_e$) from the value $p_w$), to the value $p_e$. However, an embodiment may comprise a gradual increase of the pressure from $p_w$ to $p_e$ according to a stepped gradual opening of the variable-flow valve in a manner similar to that described with reference to FIG. 5b.

According to an embodiment, and solely by way of example with reference to FIG. 3, to obtain the pressure curve of FIG. 5c during dispensing of the beverage from the dispensing device 50a, the control unit 41 controls, at the initial dispensing time t=0, the control voltage of the variable-flow valve 44a, regulating the passage of the water so as to prevent the pressure in the dispensing device 50a from rising beyond the value $p_w$, for example equal to 1.5 bar. The control unit preferably regulates the duration of the infusion time interval $t_w$ following the detection of the actual flow rate of water supplied by the valve 44a measured by the flow rate measurement device 45a and, if the detected flow rate value differs from and for example exceeds the value $p_w$, the input control voltage of the variable-flow valve is regulated. Subsequently, the electronic drive of the variable-flow valve drives the valve to a predetermined outlet opening value for a given time interval $(t_e-t_w)$ which corresponds to a nominal extraction pressure $p_e$. At the time $t_e$ the electronic drive drives the closing of the variable-flow valve. In general, it is possible to set, in the control unit, a pressure curve p(t) as a function of time, where $0 \leq t \leq t_e$.

During the dispensing step, by monitoring the flow of water detected by the device, the control unit may modify the outlet opening of the variable-flow valve in order to increase or decrease the pressure supplied by the valve to adjust the flow of water and for example to bring it to a desired value for a certain type of dispensing. For example, it may be necessary to correct the pressure if there is a deviation caused by variables connected with the fineness of grinding and the nature of blends. Controlling both the flow of water by means of the flow rate measurement device and the dispensing pressure by means of the pressure sensor makes it possible to keep the dispensing process within an optimum range.

For example, it may be that, as a result of an anomalous presence of coffee which is too finely ground, an increase in the opening of the variable-flow valve may not correspond to a greater flow rate of water and therefore to a greater pressure of the water supplied to the dispensing device, but only further obstructs the filter causing an excessive pressure which worsens the quality of the beverage.

The method of controlling the dispensing pressure preferably comprises the control of the actual flow rate of water which is supplied by the pump by means of a water flow rate measurement device disposed in the hydraulic circuit between the pump and the dispensing device. In particular, with reference to FIGS. 2-4, the flow measurement device 28 or 45a-45c may be disposed in the duct (3, 48a-48c or 68a-68c) which supplies the water from the pump to the heat exchanger.

In an embodiment, the control unit may monitor whether a predetermined dispensing pressure threshold value is being exceeded, and, if so, the control unit may signal this anomaly, for example by means of an acoustic or visual signal.

Although not explicitly mentioned in the preferred embodiments described above, the present invention may include a coffee machine which uses pre-packaged pods of ground coffee.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, without departing from the spirit and scope of the invention as defined in the appended claims.

The invention claimed is:

1. A method for controlling the dispensing pressure in a coffee machine for producing and dispensing coffee-based beverages from a plurality of dispensing devices, each dispensing device comprising a filter unit configured for containing coffee powder, the method comprising:
    providing a hydraulic circuit in fluid communication with the plurality of dispensing devices, the hydraulic circuit comprising a corresponding plurality of supply ducts connected to the plurality of dispensing devices;
    supplying pressurized water to the hydraulic circuit by means of a pump;
    providing a corresponding plurality of variable-flow valves in the plurality of supply ducts, each variable-flow valve being constructed to vary the flow of water through its respective supply duct to a dispensing device connected to the supply duct, each variable-flow valve being actuatable by a respective electronic drive which controls the flow rate of water output from the variable-flow valve and which is connected to a control unit so that each variable-flow valve can be operated independently one from another to control the flow rate of water output;
    providing a corresponding plurality of pressure sensors in the plurality of supply ducts, the plurality of pressure sensors being connected to the control unit;
    supplying from one of the variable-flow valves a predetermined quantity of water to its respective dispensing device corresponding to a nominal dispensing pressure value for the respective dispensing device;
    detecting the dispensing pressure of the respective dispensing device by means of the pressure sensor in the respective supply duct connected to the respective dispensing device; and
    if the detected dispensing pressure deviates from the nominal dispensing pressure value for the respective dispensing device, adjusting the flow rate of water supplied by the respective variable-flow valve connected to the respective dispensing device while continuing the flow of water through the respective dispensing device to adjust the detected pressure value to the nominal pressure value;
    whereby the variable-flow valves can independently control the dispensing pressure of each dispensing device without requiring any change in the flow of pressurized water being supplied by the pump, wherein the detected dispensing pressure of each dispensing device is dependent on grain size of coffee powder contained in each dispensing device, and the variable-flow valve corresponding to each dispensing device independently controls the dispensing pressure of its respective dispensing device based on the grain size of the coffee contained in the dispensing device.

2. A method according to claim 1, wherein each variable-flow valve comprises an outlet opening for supplying quantities of water to the respective dispensing device, and regulating the flow rate of water is performed by varying the outlet opening.

3. A method according to claim 2, wherein each variable-flow valve is actuatable with a variable cross-section to the flow of water of the outlet opening and supplying the predetermined quantity of water comprises selecting at least one cross-sectional value of the outlet opening, the at least one cross-sectional value corresponding to the at least one nominal pressure value.

4. A method according to claim 1, wherein supplying the predetermined quantity of water comprises detecting at least one value of the flow rate of water by means of a flow rate measurement device disposed along the hydraulic circuit.

5. A method according to claim 1, further comprising selecting a nominal dispensing time and in which regulating the flow rate of water output from the variable-flow valve is performed such that the predetermined quantity of water is supplied to the filter unit in a time substantially equal to the nominal dispensing time.

6. The method of claim 1, wherein the pump operates at a fixed flow rate.

\* \* \* \* \*